(12) United States Patent
Wang

(10) Patent No.: US 8,113,147 B1
(45) Date of Patent: Feb. 14, 2012

(54) LED LAMP AND AQUARIUM USING SAME

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 47 days.

(21) Appl. No.: 12/856,611

(22) Filed: Aug. 14, 2010

(51) Int. Cl.
*A01K 63/06* (2006.01)

(52) U.S. Cl. .......................................... 119/267

(58) Field of Classification Search .............. 119/267, 119/245, 255, 256, 265, 266, 269
See application file for complete search history.

(56) References Cited

U.S. PATENT DOCUMENTS

| | | | | |
|---|---|---|---|---|
| 3,684,882 A | * | 8/1972 | Mininno et al. | 362/184 |
| 3,990,166 A | * | 11/1976 | Nagelkirk | 40/442 |
| 4,646,209 A | * | 2/1987 | Jansen | 362/122 |
| 4,703,720 A | * | 11/1987 | Shipman et al. | 119/261 |
| 5,471,952 A | * | 12/1995 | Tsuchiya | 119/267 |
| 5,546,289 A | * | 8/1996 | Gordon | 362/101 |
| 5,597,228 A | * | 1/1997 | Boyle | 362/558 |
| 6,065,850 A | * | 5/2000 | Chiu | 362/101 |
| 6,241,362 B1 | * | 6/2001 | Morrison | 362/231 |
| 6,814,460 B1 | * | 11/2004 | Su | 362/101 |
| 7,914,166 B2 | * | 3/2011 | MacAlister | 362/101 |
| 2007/0279905 A1 | * | 12/2007 | Chan | 362/253 |
| 2010/0283369 A1 | * | 11/2010 | Chen | 313/1 |

* cited by examiner

*Primary Examiner* — Yvonne Abbott
(74) *Attorney, Agent, or Firm* — Guice Patents PLLC

(57) ABSTRACT

An aquarium includes a semi-cylindrical transparent casing for holding water and water animals and plants and covered with a top cover, a base member attached to the bottom side of the transparent casing and defining an open space, a battery-operated LED lamp detachably mounted in the open space of the base member and controllable to emit light upwardly toward the inside of the transparent casing. The battery-operated LED lamp can be removed from the base member, and attached to the top cover to emit light downwardly toward the inside of the transparent casing, or separately used as a mobile lighting tool.

10 Claims, 9 Drawing Sheets

LED LAMP AND AQUARIUM USING SAME

BACKGROUND OF THE INVENTION

1. Field of the Invention

The present invention relates to aquariums and more particularly, to an aquarium carrying a LED lamp. The invention relates also to a LED lamp for use in an aquarium.

2. Description of the Related Art

Aquarium is a water container for keeping fish and other water animals and plants. To enhance the design of an aquarium, a lamp may be used to emit light toward the inside of the aquarium. Conventionally, lamp tubes and bulbs are commonly used in aquariums. Nowadays, subject to energy saving and carbon reduction requirements, LEDs (light emitting diodes) are intensively used to substitute for lamp tubes or bulbs.

FIGS. 1~3 show three different designs of LED lamp-equipped aquariums. Basically, these designs commonly comprise a rectangular transparent casing 91 for holding water and water animals and plants, and a LED lamp 92 arranged on the top side of the transparent casing 91. Further, a power adapter cable 93 is used to obtain electricity for the LED lamp 92. The use of the power adapter cable 93 complicates the installation and arrangement of the aquarium.

Further, in either of the aforesaid prior designs shown in FIGS. 1~3, the LED lamp 92 is neither detachable nor adjustable to any other direction after its installation in the top side of the transparent casing 91. These limitations narrow the application.

SUMMARY OF THE INVENTION

The present invention has been accomplished under the circumstances in view. It is one object of the present invention to provide an aquarium with a LED lamp, which allows the LED lamp can be selectively mounted in the top or bottom side to emit light downwardly or upwardly toward the inside of the transparent casing that holds water and water animals and plants, or separately used as a mobile lighting tool.

To achieve this and other objects of the present invention, an aquarium comprises a transparent casing for holding water and water animals and plants, the transparent casing having a top opening located on the top side thereof and a plurality of rounded protrusions raised from the top surface of the bottom wall thereof; a top cover adapted for closing the top opening of the transparent casing; a base member attached to the bottom surface of the bottom wall of the transparent casing and defining an open space corresponding to the rounded protrusions of the transparent casing; and a LED lamp detachably mounted in the open space in the base member, the LED lamp comprising a plurality of light emitting diodes respectively kept in vertical alignment with the rounded protrusions of the transparent casing, a set of battery cells, a switch electrically connected between the light emitting diodes and the set of battery cells and controllable to switch on/off the light emitting diodes.

Further, the LED lamp comprises a USB socket for the insertion of an external USB cable to charge/discharge the set of battery cells.

Further, the top cover comprises a plurality of ribs raised from a top side thereof for securing the LED lamp to the top cover after removable of the LED lamp from the base member, enabling the light emitting diodes to emit light downwardly toward the inside of the transparent casing.

Further, the transparent casing has a semi-cylindrical shape; the top cover is shaped like a semi-circular plate fitting the cross section of the transparent casing; the base member is shaped like a semi-cylindrical block fitting the semi-cylindrical shape of the transparent casing; the open space extends vertically through top and bottom sides of the base member so that the LED lamp is kept in contact with the bottom wall of the transparent casing after insertion into the open space.

Further, the LED lamp comprises a heat plate adapted to generate a heat energy and provide the generated heat energy to the transparent casing to warm up a liquid in the transparent casing.

Because the LED lamp is detachably mounted in the base member of the aquarium, the user can selectively set the LED lamp in the bottom or top side of the transparent casing to emit light from the bottom or top side of the transparent casing toward the inside of the transparent casing. Alternatively, the user can remove the LED lamp from the base member for use as a mobile lighting tool. Further, because the LED lamp uses the battery cells to provide the necessary working voltage, no any cable is necessary, facilitating the use. Therefore, the invention shows advantages over the prior art designs.

The invention also provides a LED lamp detachably mountable in an aquarium comprising a transparent casing having a top opening and a plurality of rounded protrusions raised from the top surface of the bottom wall thereof, a top cover for closing the top opening of the transparent casing and a base member attached to the bottom wall of the transparent casing on the outside and defining an open space corresponding to the rounded protrusions of the transparent casing. The LED lamp comprises a plurality of light emitting diodes, which are respectively kept in vertical alignment with the rounded protrusions of the transparent casing after insertion of the LED lamp in the open space of the base member of the aquarium; a set of battery cells; and a switch electrically connected between the light emitting diodes and the set of battery cells and controllable to switch on/off the light emitting diodes.

DETAILED DESCRIPTION OF THE PREFERRED EMBODIMENT

Figure 1:
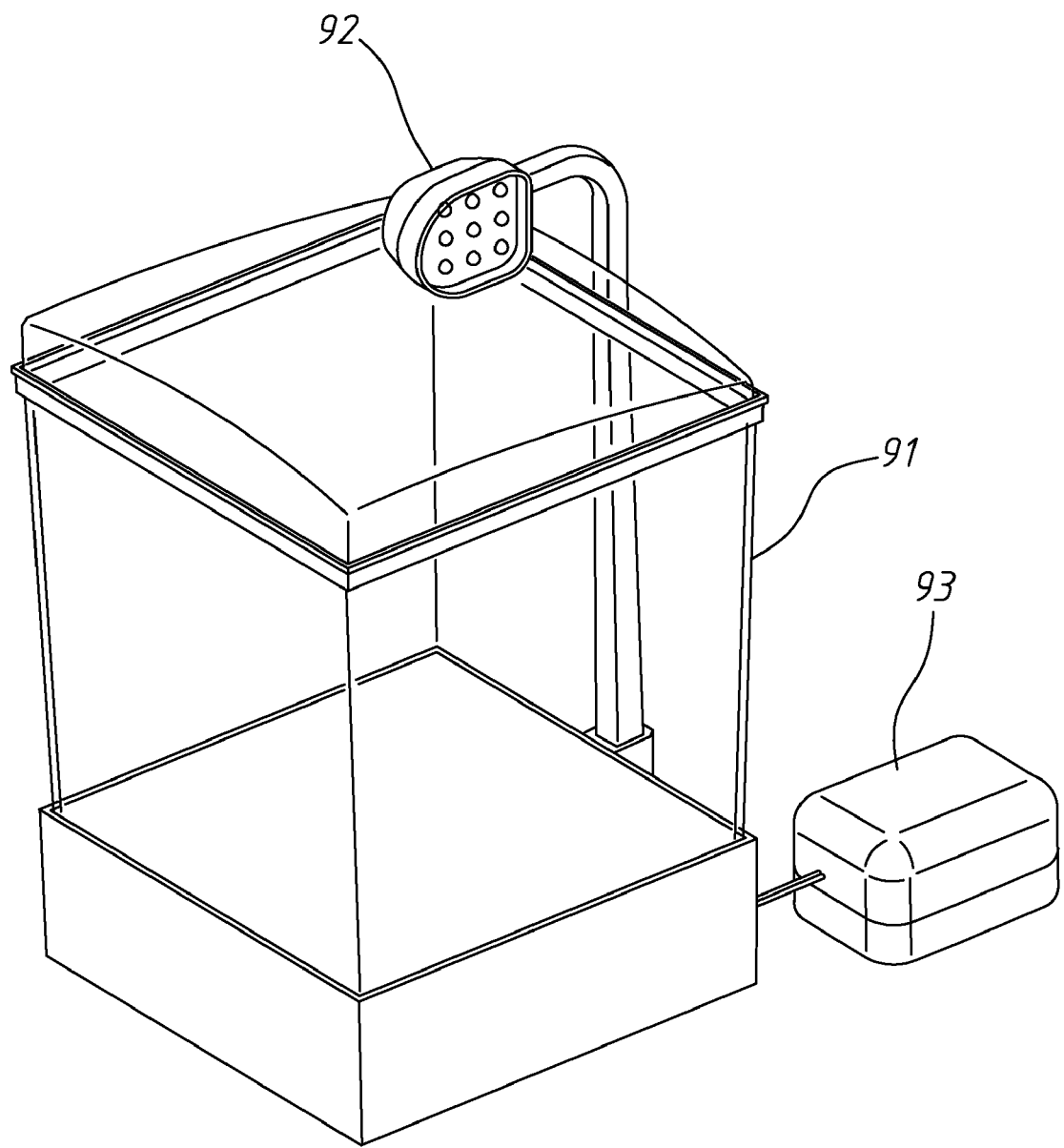
FIG. 1 is a perspective view of an aquarium with a LED lamp according to the prior art.
Figure 2:
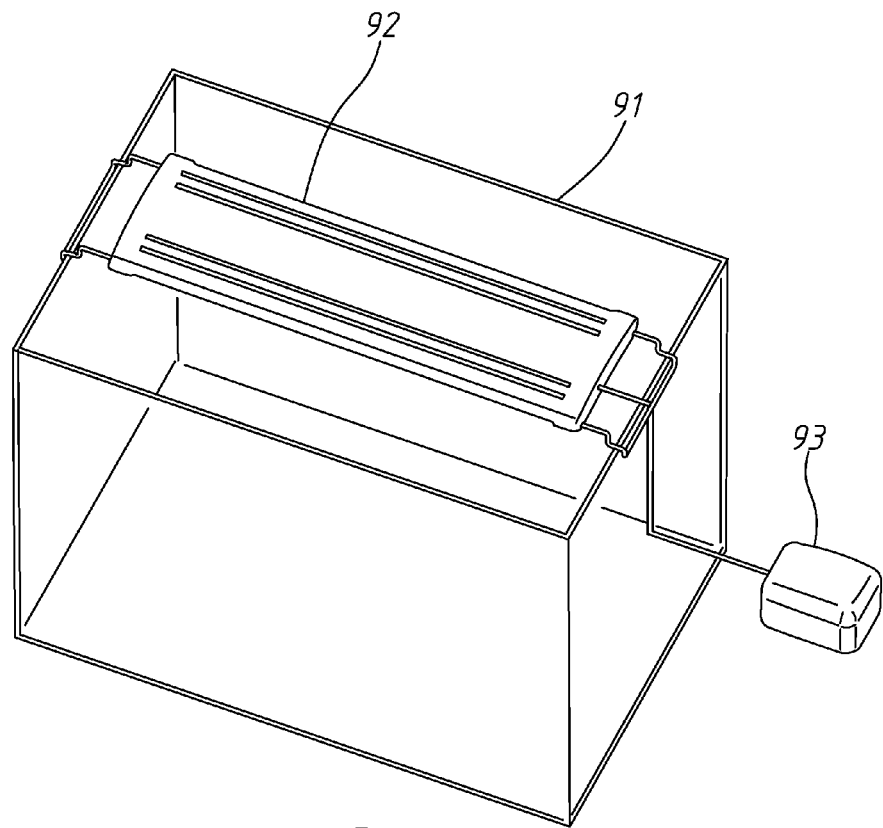
FIG. 2 illustrates another design of aquarium with a LED lamp according to the prior art.
Figure 2A:
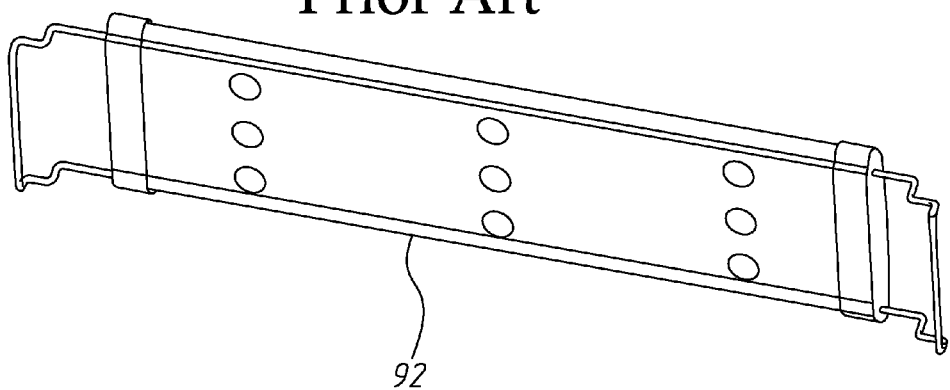
FIG. 2A is a perspective bottom view of the LED lamp shown in FIG. 2.
Figure 3:
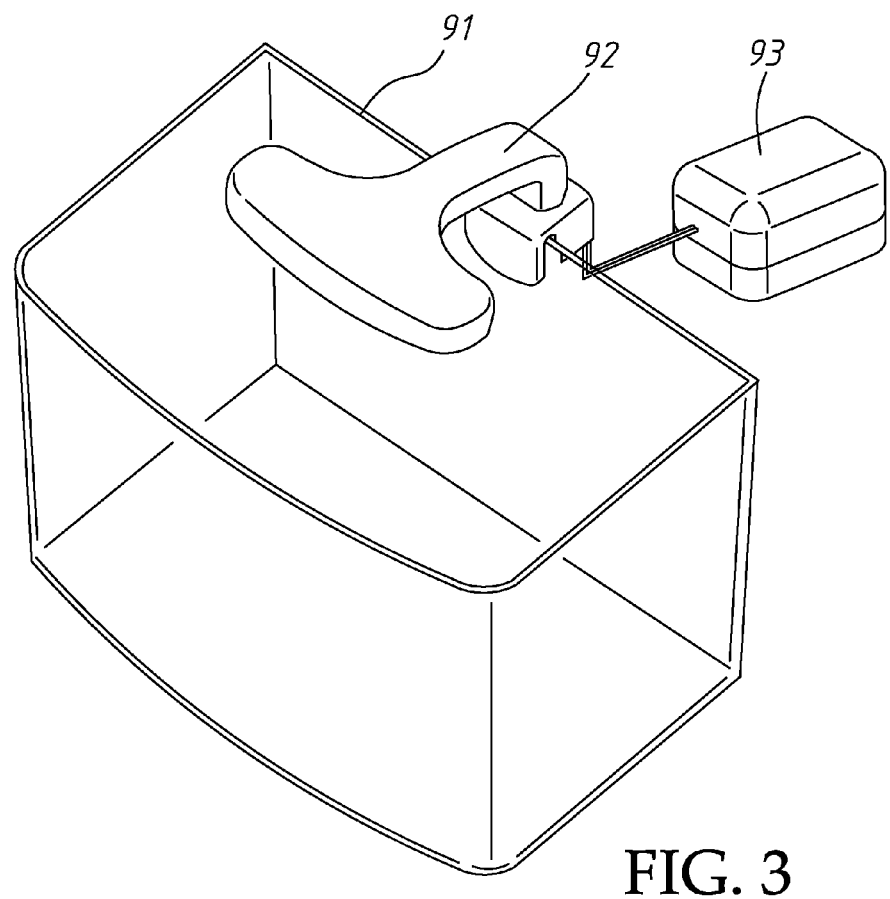
FIG. 3 illustrates still another design of aquarium with a LED lamp according to the prior art.
Figure 3A:
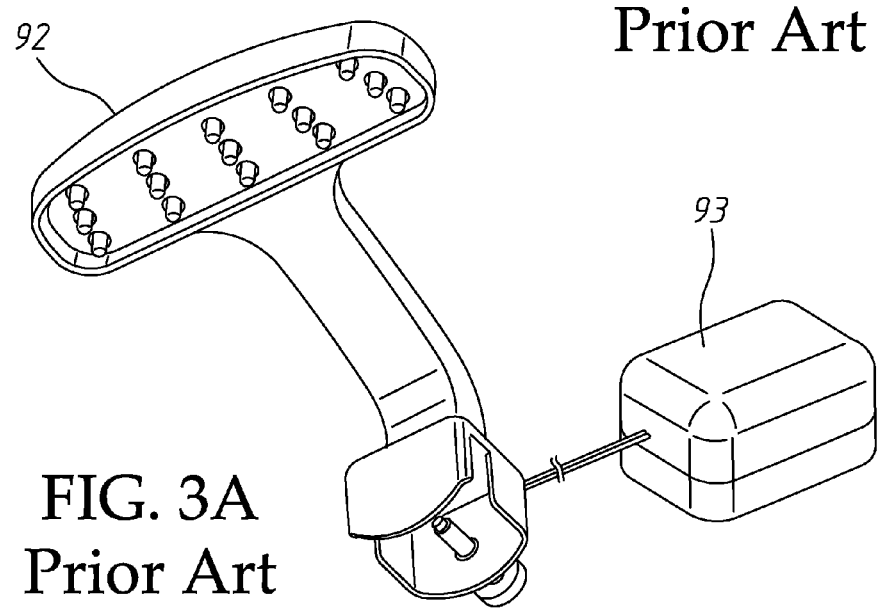
FIG. 3A is an oblique bottom elevation of the LED lamp shown in FIG. 3.
Figure 4:
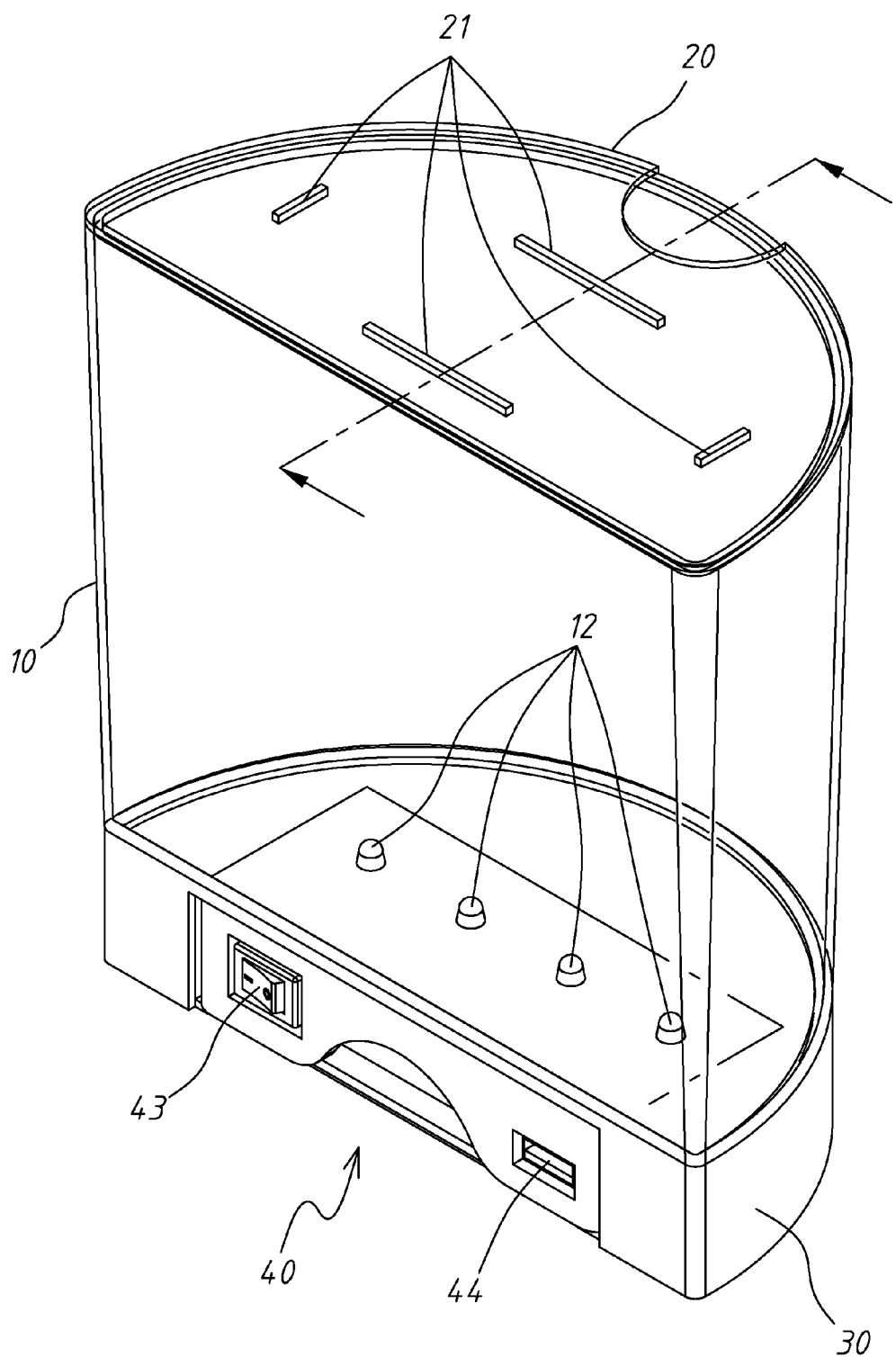
FIG. 4 is an elevational view of an aquarium in accordance with a first embodiment of the present invention.
Figure 5:
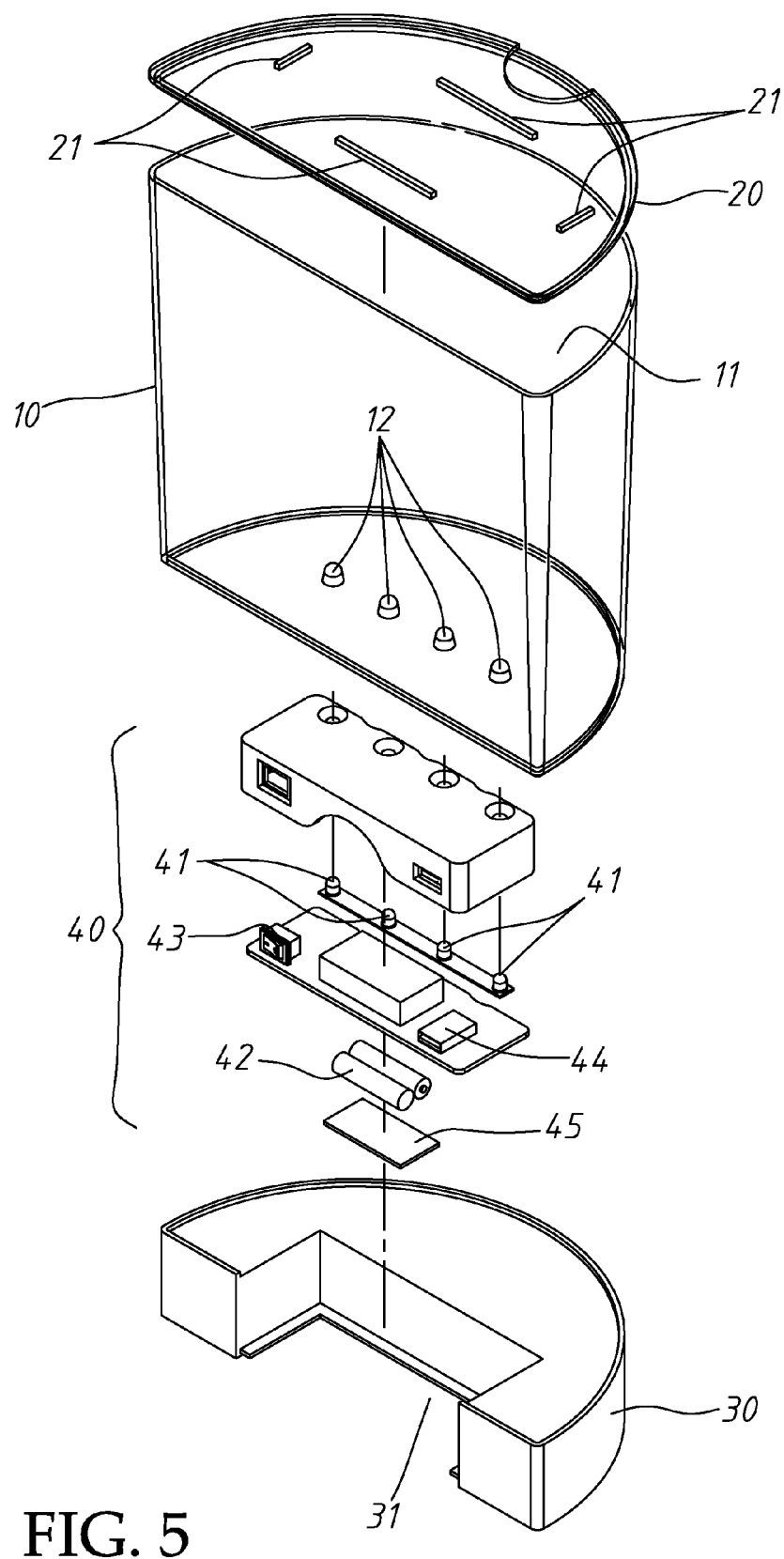
FIG. 5 is an exploded view of the aquarium in accordance with a first embodiment of the present invention.
Figure 6:
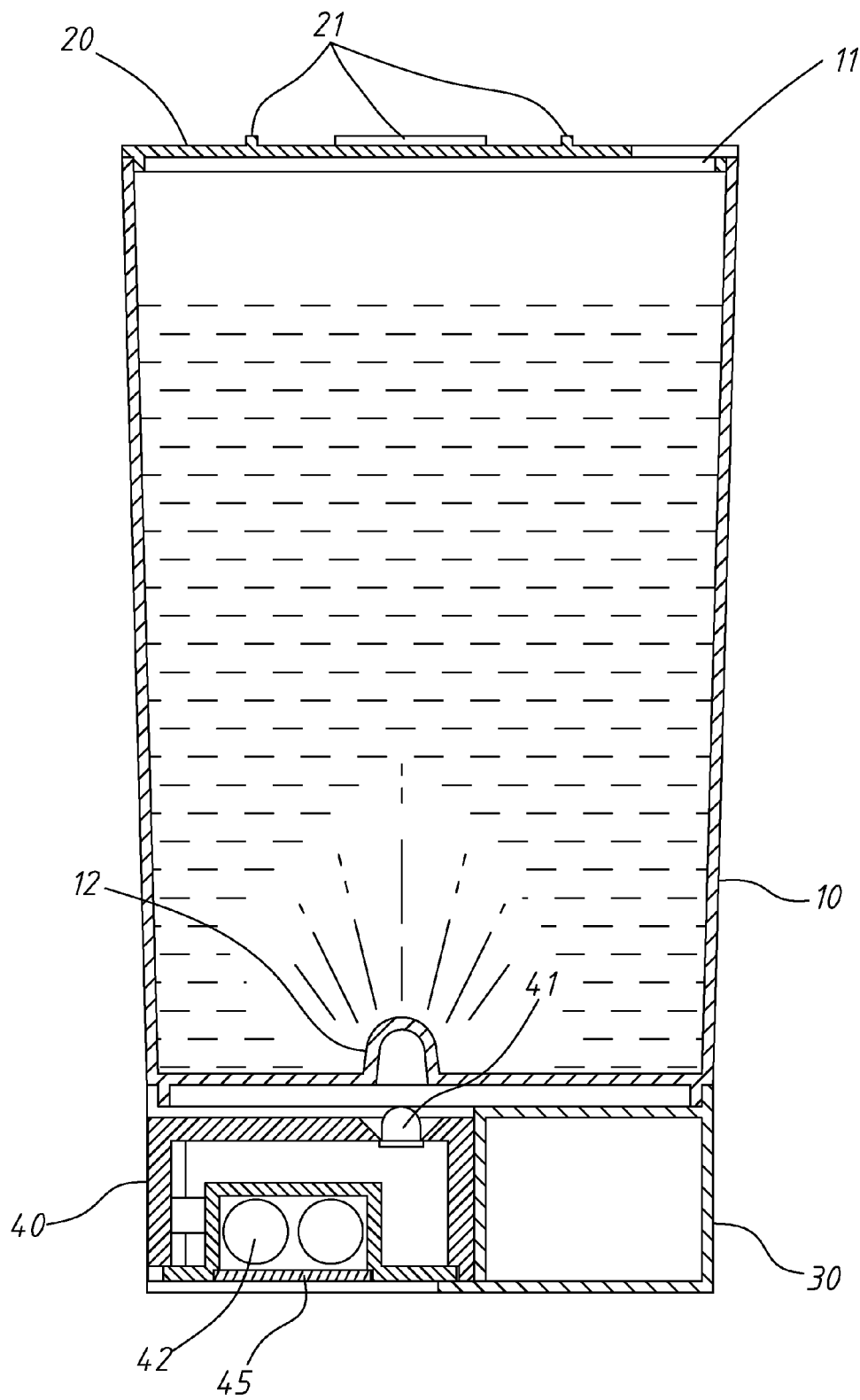
FIG. 6 is a schematic side view of the first embodiment of the present invention, showing an application example of the LED lamp.

Referring to FIGS. 4~6, an aquarium in accordance with a first embodiment of the present invention is shown comprising a transparent casing 1, a top cover 20, a base member 30 and a LED lamp 40.

The transparent casing 10 is a semi-cylindrical container for holding water and water animals and plants, having a top opening 11 and a plurality of rounded protrusions 12 raised from the top surface of the bottom wall thereof.

The top cover 20 is a semi-circular plate adapted for closing the top opening 11 of the transparent casing 10, having a plurality of ribs 21 raised from the top wall thereof.

The base member 30 is a semi-circular block attached to the bottom side of the transparent casing 10, defining an open space 31 corresponding to the rounded protrusions 12 of the transparent casing 10 for accommodating the LED lamp 40 to kept the LED lamp 40 in close contact with the bottom wall of the of the transparent casing 10.

The LED lamp 40 is mounted in the open space 31 in the base member 30, comprising a plurality of LEDs 41 respectively kept in vertical alignment with the rounded protrusions 12 of the transparent casing 10, a set of battery cells 42, a switch 43 electrically connected between the LEDs 41 and the set of battery cells 42 and controllable to switch on/off the LEDs 41, a USB socket 44 for the insertion of an external USB cable (not shown) to charge the set of battery cells 42 with an external power source, and a battery lid 45 located on the bottom side thereof. When switched on the switch 43, the LEDs 41 are turned on to emit light through the rounded protrusions 12 into the space inside the transparent casing 10, as shown in FIG. 6. When opened the battery lid 45, the user can replace the set of battery cells 42.

Normally, as shown in FIG. 4, the LED lamp 40 is fitted into the open space 31 in the base member 30, and controlled to emit light through the rounded protrusions 12 into the space inside the transparent casing 10. In case of power failure, the user can remove the LED lamp 40 from the open space 31 of the base member 30 for use as a mobile lighting fixture.

Figure 7:
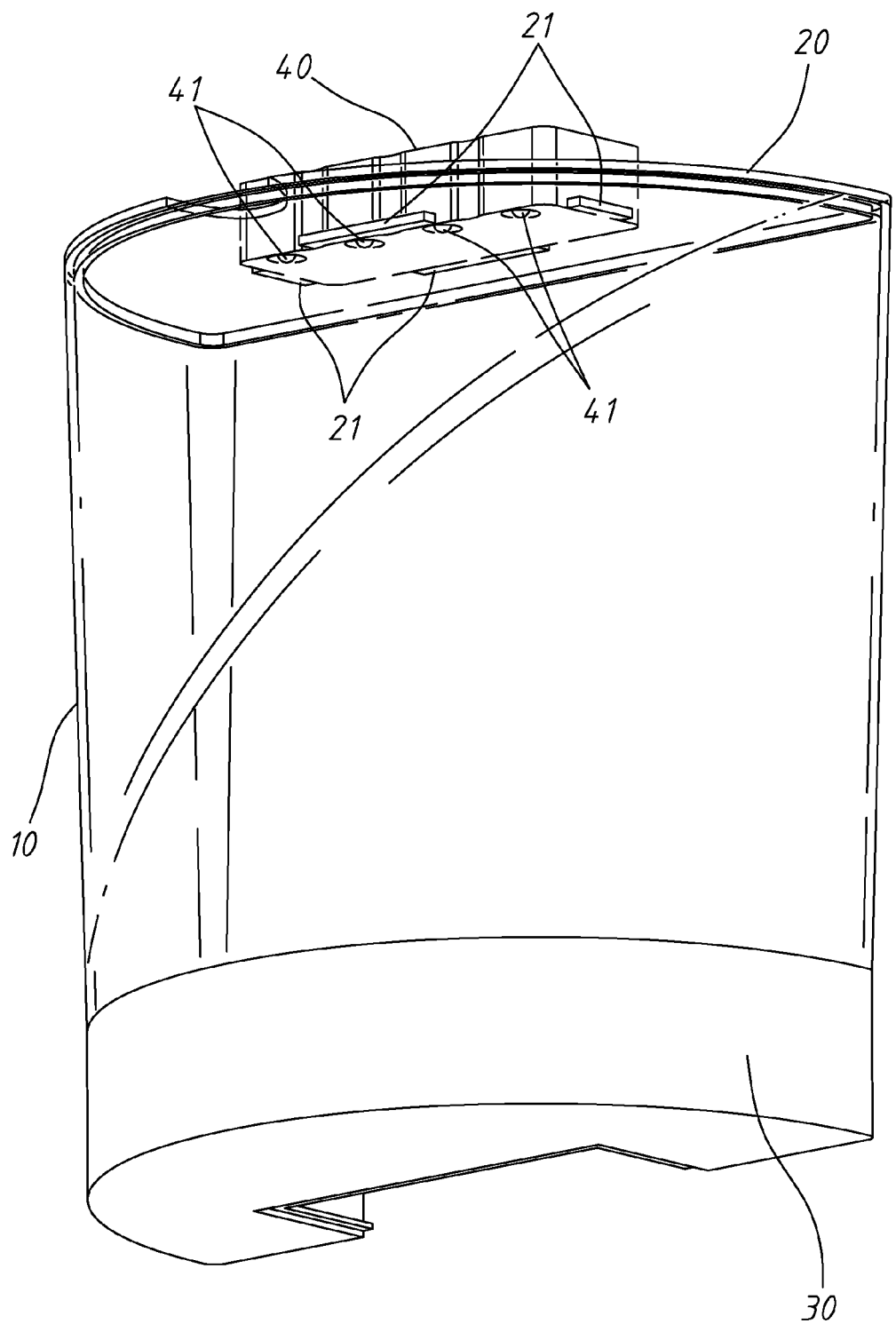
FIG. 7 illustrates another application example of the LED lamp of the aquarium in accordance with the first embodiment of the present invention.

Referring to FIG. 7, the LED lamp 40 can be removed from the open space 31 of the base member 30 and attached to the top side of the top cover 20 and secured in place by the ribs 21, and then the LEDs 41 can be switched on to emit light downwardly toward the inside of the transparent casing 10, illuminating the sands and other decorative elements set in the transparent casing 10.

Figure 8:
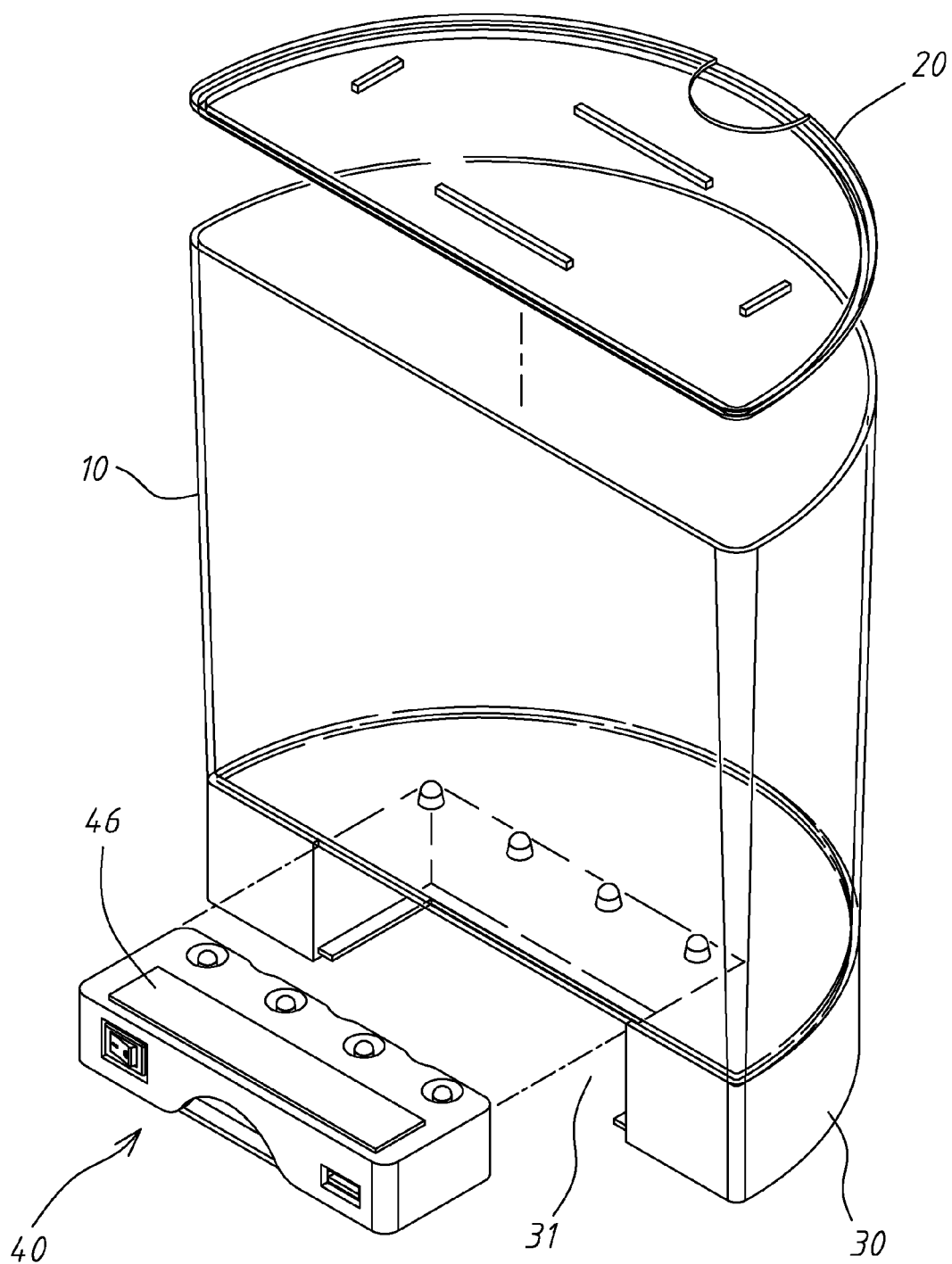
FIG. 8 is an exploded view of an aquarium in accordance with a second embodiment of the present invention.
Figure 9:
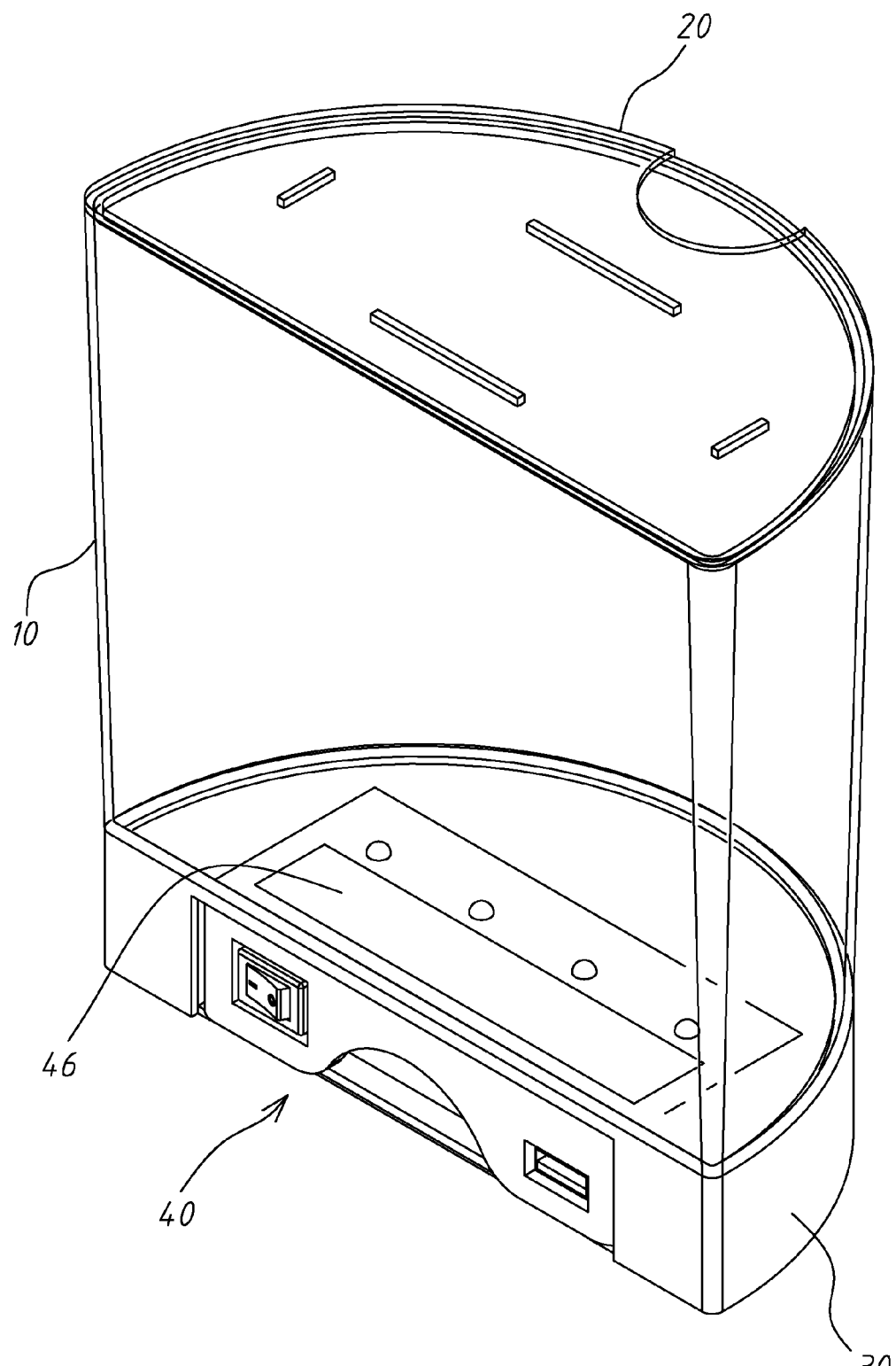
FIG. 9 is an elevational assembly view of the aquarium in accordance with a second embodiment of the present invention.

FIGS. 8 and 9 show an aquarium in accordance with a second embodiment of the present invention. This second embodiment is substantially similar to the aforesaid first embodiment with the exception that the LED lamp 40 of this second embodiment further comprises a heat plate 46 located on the top side thereof. After installation of the LED lamp 40 in the open space 31 in the base member 30, the heat plate 46 is kept in contact with or in proximity to the bottom wall of the transparent casing 10 and adapted to generate a heat energy and to provide the generated heat energy to the transparent casing 10, warming the water in the transparent casing 10. The heat plate 46 can also be used in any other pet box to give warm.

As stated above, the LED lamp 40 is detachably mounted in the base member 30 of the aquarium. The user can selectively set the LED lamp 40 in the bottom or top side of the transparent casing 10 to emit light from the bottom or top side of the transparent casing 10 toward the inside of the transparent casing 10. Alternatively, the user can remove the LED lamp 40 from the base member 30 for use as a mobile lighting tool.

Further, because the LED lamp 40 uses the battery cells 42 to provide the necessary working voltage, no any cable is necessary, facilitating the use. Therefore, the invention shows advantages over the prior art designs.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An aquarium, comprising:
a transparent casing for holding water and water animals and plants, said transparent casing having a top opening located on a top side thereof and a plurality of rounded protrusions raised from a top surface of a bottom wall thereof;
a top cover adapted for closing the top opening of said transparent casing;
a base member attached to a bottom surface of the bottom wall of said transparent casing, said base member defining an open space corresponding to the rounded protrusions of said transparent casing; and
a LED lamp detachably mounted in the open space in said base member, said LED lamp comprising a plurality of light emitting diodes respectively kept in vertical alignment with the rounded protrusions of said transparent casing, a set of battery cells, a switch electrically connected between said light emitting diodes and said set of battery cells and controllable to switch on/off said light emitting diodes.

2. The aquarium as claimed in claim 1, wherein said LED lamp further comprises a USB socket for the insertion of an external USB cable to charge/discharge said set of battery cells.

3. The aquarium as claimed in claim 1, wherein said top cover comprises a plurality of ribs raised from a top side thereof for securing said LED lamp to said top cover after removable of said LED lamp from said base member, enabling said light emitting diodes to emit light downwardly toward the inside of said transparent casing.

4. The aquarium as claimed in claim 1, wherein said transparent casing has a semi-cylindrical shape; said top cover is shaped like a semi-circular plate fitting the cross section of said transparent casing; said base member is shaped like a semi-cylindrical block fitting the semi-cylindrical shape of said transparent casing; said open space extends vertically through top and bottom sides of said base member so that said LED lamp is kept in contact with the bottom wall of said transparent casing after insertion into said open space.

5. The aquarium as claimed in claim 1, wherein said LED lamp further comprises a battery lid openably arranged on a bottom side thereof for allowing access to said set of battery cells.

6. The aquarium as claimed in claim 1, wherein said LED lamp further comprises a heat plate adapted to generate a heat energy and provide the generated heat energy to said transparent casing to warm up a liquid in said transparent casing.

7. A LED lamp detachably mountable in an aquarium comprising a transparent casing having a top opening and a plurality of rounded protrusions raised from a top surface of a bottom wall thereof, a top cover for closing the top opening of said transparent casing and a base member attached to the bottom wall of said transparent casing on the outside and defining an open space corresponding to the rounded protrusions of said transparent casing, the LED lamp comprising:
- a plurality of light emitting diodes, which are respectively kept in vertical alignment with the rounded protrusions of said transparent casing after insertion of the LED lamp in the open space of said base member of said aquarium;
- a set of battery cells; and
- a switch electrically connected between said light emitting diodes and said set of battery cells and controllable to switch on/off said light emitting diodes.

8. The LED lamp as claimed in claim 7, further comprising a USB socket for the insertion of an external USB cable to charge/discharge said set of battery cells.

9. The LED lamp as claimed in claim 7, further comprising a battery lid openably arranged on a bottom side thereof for allowing access to said set of battery cells.

10. The LED lamp as claimed in claim 7, further comprising a heat plate adapted to generate a heat energy and provide the generated heat energy to said transparent casing to warm up a liquid in said transparent casing.

* * * * *